United States Patent [19]

Mack

[11] 4,243,203
[45] Jan. 6, 1981

[54] BUTTERFLY VALVE

[76] Inventor: Lawrence W. Mack, 73285 Bursera Way, Palm Desert, Calif. 92260

[21] Appl. No.: 59,168

[22] Filed: Jul. 20, 1979

[51] Int. Cl.³ .............................................. F16K 1/22
[52] U.S. Cl. ................................................. 251/305
[58] Field of Search .............. 251/173, 305, 306, 307, 251/308

[56] References Cited

U.S. PATENT DOCUMENTS

| 813,771 | 2/1906 | Bush | 251/306 |
|---|---|---|---|
| 1,131,371 | 3/1915 | Hatfield | 251/305 |
| 1,594,374 | 8/1926 | Nordin | 251/305 |
| 2,986,373 | 5/1961 | Masheder | 251/305 |
| 3,096,071 | 7/1963 | Fisher | 251/306 |
| 3,330,177 | 1/1967 | Topham et al. | 251/308 |
| 3,591,133 | 7/1971 | Miles et al. | 251/308 |
| 4,032,108 | 6/1977 | Kintner | 251/306 |

FOREIGN PATENT DOCUMENTS

| 37481 | 3/1886 | Fed. Rep. of Germany | 251/305 |
|---|---|---|---|
| 362690 | 10/1922 | Fed. Rep. of Germany | 251/306 |
| 699819 | 11/1940 | Fed. Rep. of Germany | 251/305 |
| 1083611 | 6/1960 | Fed. Rep. of Germany | 251/305 |
| 881436 | 11/1961 | United Kingdom | 251/305 |

*Primary Examiner*—William R. Cline
*Assistant Examiner*—H. Jay Spiegel
*Attorney, Agent, or Firm*—Martin R. Horn

[57] ABSTRACT

A butterfly valve disk plate having a plurality of fluid directing ribs extending from the disc perpendicular to the plane of the disk, the ribs on one side of the disk being located opposite the spaces between the ribs on the other side of the disk and the ribs on one half of one side of the disk being staggered with respect to the ribs on the other half of the same side of the disk.

2 Claims, 4 Drawing Figures

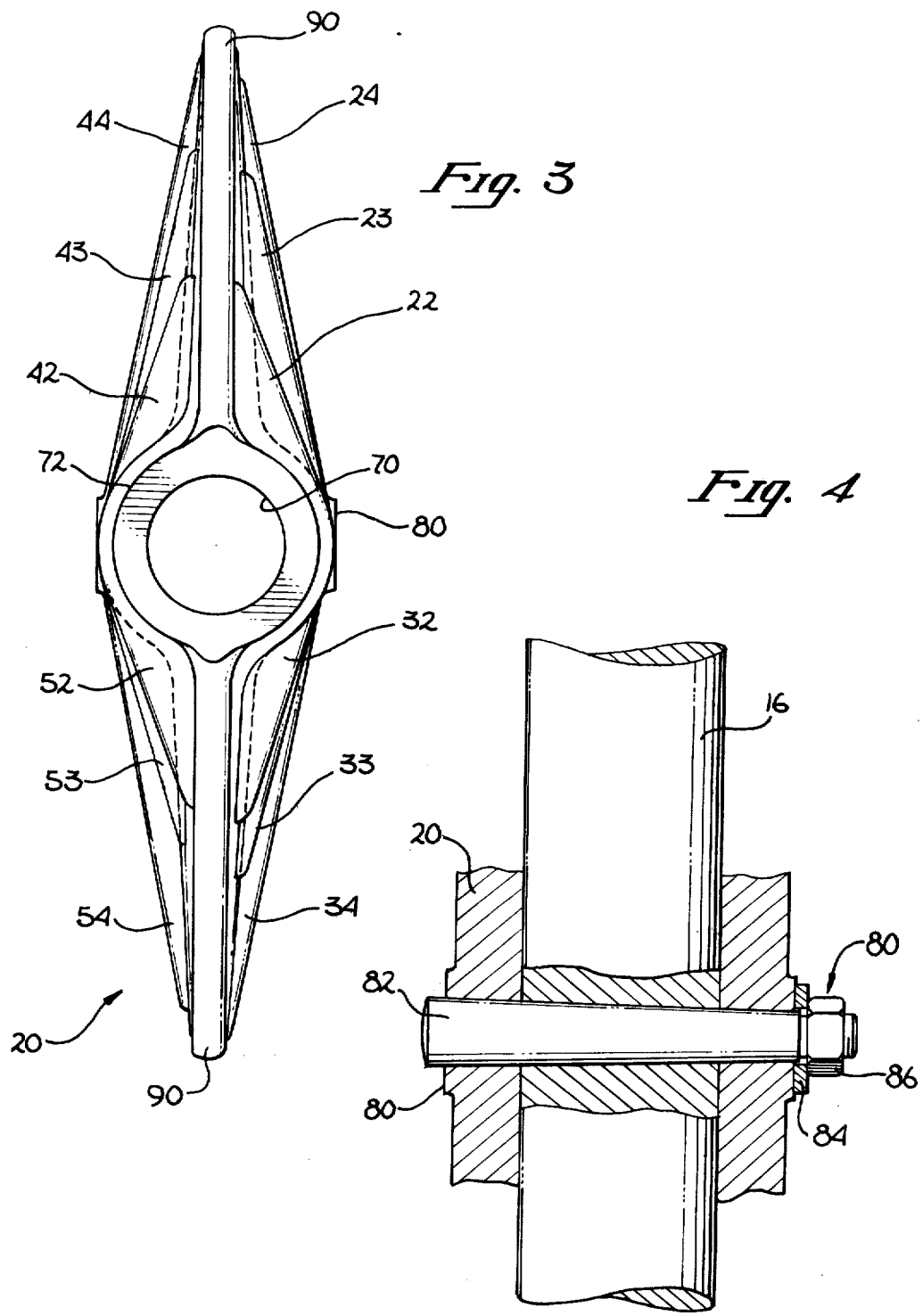

BUTTERFLY VALVE

BACKGROUND

1. Field of the Invention

This invention relates to the design of butterfly valves and in particular to the design of the disk shaped valve plate of butterfly valves.

2. Prior Art

Prior art butterfly valves have employed disks having strengthening ribs as shown in the U.S. Pat. to Henry Masheder No. 2,986,373 issued May 30, 1961. Such strengthening ribs typically span the major portion of the face of the disk and are parallel to the direction of fluid flow. The ribs may be located on one or both sides of the disk.

It is the general objective of all butterfly valves to provide an effective valve seal assembly which results in a minimum pressure drop across the valve, requires minimum force to operate the valve and produces minimum turbulence and noise.

It is thus an object of the present invention to provide a butterfly valve which results in an improvement over prior art valves in each of the performance criteria referred to above.

SUMMARY OF THE INVENTION

The invention comprises a butterfly valve disk plate having a novel arrangement of fluid directing ribs which result in minimal pressure drop across the valve, minimum turbulance in the fluid and hence minimum noise as the fluid passes through the valve and, in addition, a minimum torque is required to open or close the valve.

The disk plate of the valve is provided with a cylindrical passage through the body of the disk and along a diameter thereof. The passage allows the disk to be mounted on a shaft for rotation therewith within said valve. The disk plate has a first side and a second side each of which can be further divided in half along the axis of the cylindrical passage. The present invention comprises the arrangement of fluid flow directing ribs on one side of the disk plate such that the ribs lying on one side of the axis of the cylindrical passage are staggered with respect to the ribs located on the other side of the axis of the cylindrical passage. The ribs are further arranged such that the ribs on one surface of the disk plate are located opposite the spaces between the ribs located on the second surface of the disk plate. Each rib extends substantially from the axis of the cylindrical passage to nearly the edge of the disk plate and all ribs are parallel to one another.

It has been found that this particular arrangement of ribs results in a reduced pressure drop across the valve, causes less turbulence in the fluid as it passes through the valve and hence the valve is quieter than similar valves of the prior art. In addition, less force is required to operate the valve.

BRIEF DESCRIPTION OF THE DRAWINGS

FIG. 3 is an end view of the valve disk plate shown in FIG. 2.

FIG. 4 is a partial sectional view taken along the line 4—4 of FIG. 2.

DETAILED DESCRIPTION OF THE INVENTION

Figure 1:
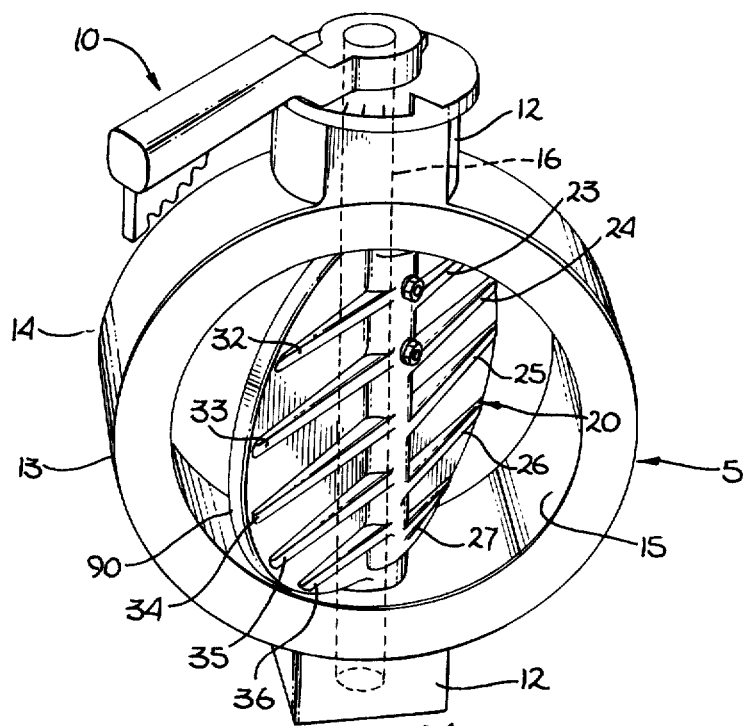
FIG. 1 is a perspective view of the valve disk plate of the present invention installed within the typical butterfly valve assembly.

The valve plate disk 20 of the present invention is intended to be housed within the typical butterfly valve assembly 5 as shown in FIG. 1. As shown in FIG. 1, the major components of valve 5 include a tubular valve housing 13, a shaft 16, bearing housings 12 and handle 10. The valve 5 is either opened or closed depending on the position of the valve plate disk 20. The valve housing 13 has an outer cylindrical surface 14 and an inner cylindrical surface 15. The fluid which is to be controlled by the valve 5 flows through the passageway defined by the inner cylindrical surface 15 of valve housing 13. The valve disk plate 20 is mounted on a shaft 16 within the fluid passageway such that when the plane of the valve disk plate is perpendicular to the direction of flow of the fluid the valve 5 is closed. The valve disk plate is affixed to a shaft 16 such that rotation of the shaft 16 causes the valve disk plate 20 also to rotate. When the plane of the valve disk plate 20 is parallel to the direction of fluid flow the valve 5 is fully open. The valve 5 may be made partially open by rotating the shaft 16 such that the plane of the valve plate disk 20 is neither parallel to nor perpendicular to the direction of flow of the fluid. This rotation of the shaft 16 may be effected by manually applying a force to handle 10 as shown in FIG. 1. Alternatively, the rotation of shaft 16 may be effected by an electric motor, a hydraulic actuator, or any other suitable drive means. Each end of shaft 16 is mounted in a bearing within the bearing housings 12. While the shaft 16 is indicated to be a single shaft in FIG. 1, it could as well be comprised of two separate shafts one mounted in each of the bearing housings 12, each extending only partially into the body of the disk 20.

Figure 2:
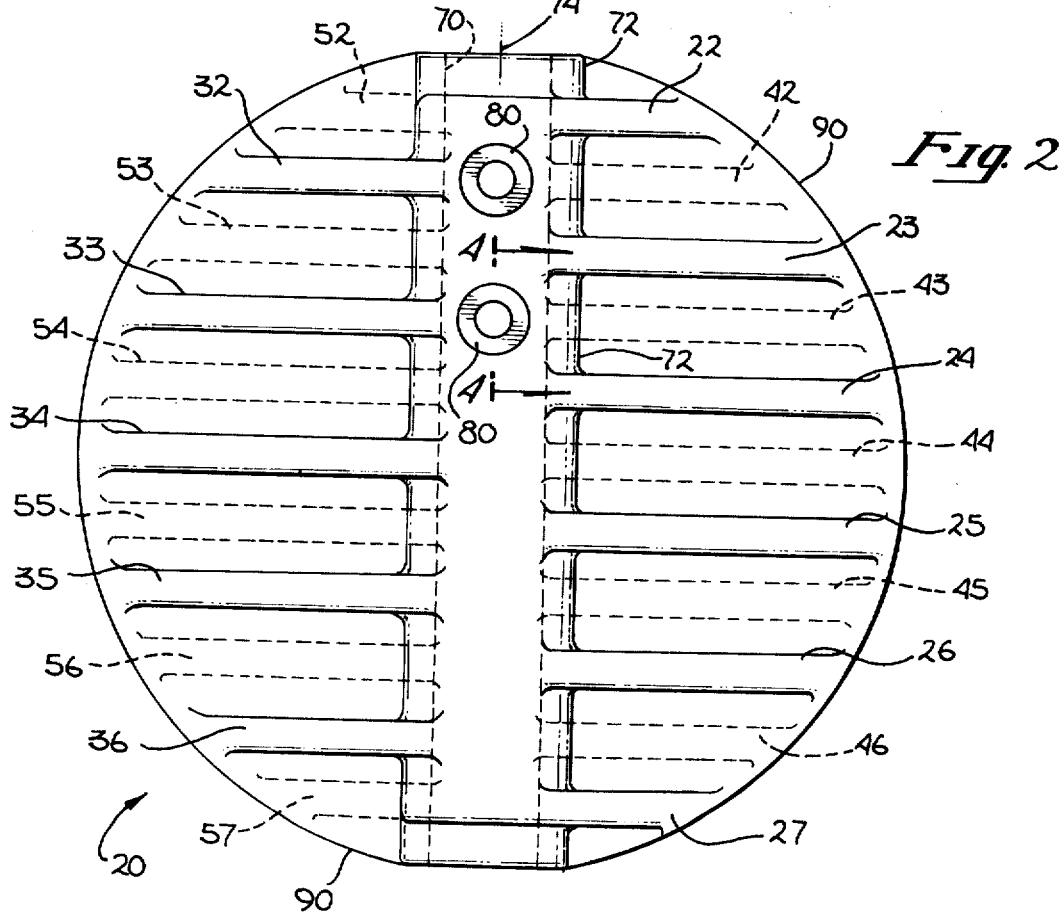
FIG. 2 is a plan view of one side of the valve disk plate illustrating the placement of the ribs.

The present invention is directed solely to the valve disk plate 20 which is shown in FIGS. 2 and 3. The valve disk plate is provided with a cylindrical passage 74 defined by an interior cylindrical surface 70 and an outer generally cylindrical surface 72. This passage 74 lies along a diameter of the valve disk plate 20 which is mounted on a shaft 16 by mounting means 80. The valve disk plate 20 is provided with a plurality of ribs 22 through 27, 32 through 36, 42 through 46 and 52 through 57. Ribs 22 through 27 and ribs 32 through 36 are located on one side of the valve disk plate 20 and ribs 42 through 46 and 52 through 57 are located on the other side of the valve disk plate 20.

As shown in FIG. 2, each side of the valve disk plate 20 can be conceptually divided into a left half and a right half along the axis of passage 74. The ribs 22 through 27 are spaced and arranged so as to be staggered with the ribs 32 through 36. Thus rib 22 extends from approximately the center of one side of the valve disk plate toward the right hand edge 90 of the plate and lies perpendicular to the axis of passage 74. Rib 32 is slightly below rib 22 and extends from approximately the center of the valve plate disk toward the left hand edge 90 of the plate and is perpendicular to the axis of passage 74. Rib 23 is located below rib 32 and extends toward the right hand edge 90 of the plate. The ribs continue to alternately extend toward the left hand edge and then the right hand edge, each rib being equally spaced from the ribs immediately above and below it.

The ribs 42 through 46 and ribs 52 through 57 are similarly placed and staggered on the other side of valve plate disk 20, and in addition each such rib is located opposite the space between the ribs on the other side of the valve plate disk. Thus, for example, there are shown ribs 24 and 25 on the right hand side of valve disk plate 20. Extending toward the left and vertically midway between ribs 24 and 25 is rib 34. Rib 44 extends toward the right and is midway between ribs 24 and 25 and is located on the back side of valve plate disk 20.

If the height of a rib is defined as the distance from the edge of the rib to the plane of the valve plate disk 20, then the height of each rib is greatest near the axis of passage 74 and gradually narrows as the rib extends outward from the axis of passage 74.

FIG. 3 clearly illustrates the configuration of the ribs as they alternate from one side of the valve disk plate 20 to the other side. For example, rib 22 is shortest, rib 42 is located on the other side of valve disk plate 20 and is slightly longer than rib 22. Rib 23 is slightly longer than rib 42 and located on the same side of valve disk plate 20 as is rib 22.

The edge 90 of the valve plate disk may be appropriately coated with a plastic like material such as teflon or other suitable material to insure proper sealing of the valve upon closure of the valve disk plate 20.

The valve disk plate 20 is fixed for rotation with the shaft 16 by attachment means 80 which in FIG. 4 is shown as a tapered pin 82 that is threaded at its smaller end. Proper alignment of the shaft 16 and valve plate disk 20 forms two tapered or conical bores to receive the tapered pins 82 which are secured in place by means of washer 84 and nut 86. By application of a force to handle 10 the shaft 16 and valve plate disk 20 are caused to rotate thus opening or closing the valve 5.

The butterfly valve disk plate as described above exhibits a much improved rated flow coefficient C/V, defined as the volume of water per minute that will pass through a given valve opening with a pressure drop across the valve of one pound per square inch. Alternatively the C/V coefficient can be stated mathematically as:

$$C_V = Q\sqrt{\frac{\rho}{62.4 \Delta P}}$$

where:
ρ-weight of fluid in pounds per cubic feet
Q-rate of flow in gallons per minute
ΔP-differential pressure in pounds per square inch gauge This latter expression of C/V is the definition used in the chart below. A comparison of the rated flow coefficient for typical and comparable 16" diameter butterfly valves, manufactured according to the prior art, with the rated flow coefficient of the 16" diameter butterfly valve of the present invention is given in the following chart. The comparison is made for varying degrees of value opening, i.e., 30, 60 and 90 degrees (90° is fully open).

| | C/V Deflection (Valve Opening) | | |
|---|---|---|---|
| Manufacturer | 30° | 60° | 90° (Full Open) |
| CRANE (For Gem, Monarch, and AWWA series) | Not Available | Not Available | 13,500 |
| CENTERLINE (For 'AA', 'LD', 'LT' and 'AWWA') | 841 | 3498 | 10,821 |
| VALVE OF PRESENT INVENTION | 895 | 5113.1 | 14,311 |

As shown in the chart the butterfly valve of the present invention exhibits superior (higher) C/V coefficients, indicative of improved flow through the valve.

The butterfly valves of the present invention also operate more quietly, i.e. less noise is produced by the fluid as it passes through the valve and less turbulence is generated as compared to prior art butterfly valve constructions.

Having described the structure and operation of the present invention, it will be readily apparent to one of ordinary skill in the art that various changes, modifications and additions such as changes in the handle means, changes in the numbers of ribs used, changes in the shaft structure such as replacing the shaft by two shorter shafts, and changes in the precise shape of the ribs can all be made without departing from the spirit and scope of the invention as set forth in the following claims.

What is claimed is:

1. In a butterfly valve assembly comprising a valve plate disk having a first side and a second side, said valve plate disk being adapted for rotation about an axis of said valve plate disk whereby said valve assembly may be opened and closed, the improvement comprising:

a valve plate disk provided with a plurality of fluid directing ribs on each side thereof, the length of which lie perpendicular to said axis of rotation, which ribs project perpendicular from the plane of the valve plate disk and which ribs extend only from a location proximate the axis of rotation to a location proximate the edge of said valve plate disk;

wherein the ribs located on one side of said valve plate disk are alternately located on one side of said axis and then the other side of said axis as one proceeds along said axis from one end thereof to the other, each rib being equally spaced from the rib above it and the rib below it, and wherein the ribs located on said second side of said valve plate disk are located opposite the spaces between the ribs located on said first side of said valve plate disk.

2. The improvement according to claim 1 wherein the height of said ribs is greatest near said axis and the height tapers gradually toward the edge of said valve plate disk where the height is least.

* * * * *